United States Patent [19]

Farrall

[11] Patent Number: 4,788,628
[45] Date of Patent: Nov. 29, 1988

[54] BANKLIGHT SYSTEM FOR PRODUCING VARIABLE GRADATION LIGHTING EFFECTS

[75] Inventor: Donald R. Farrall, Carrollton, Tex.

[73] Assignee: Farrall Instruments, Inc., Grand Island, Nebr.

[21] Appl. No.: 114,297

[22] Filed: Oct. 28, 1987

[51] Int. Cl.⁴ .................................................. G03B 15/02
[52] U.S. Cl. ..................................... 362/18; 362/282; 362/310
[58] Field of Search ................... 362/3, 11, 16, 17, 18, 362/282, 300, 301, 310, 359, 307

[56] References Cited

U.S. PATENT DOCUMENTS

| | | | |
|---|---|---|---|
| 191,888 | 6/1877 | Schaeffer et al. | 362/322 |
| 578,995 | 3/1897 | Kincaid | 362/322 |
| 1,184,613 | 5/1916 | Boyd et al. | 362/322 |
| 1,485,853 | 3/1924 | Jones | 362/343 |
| 1,573,420 | 2/1926 | Phillips | 362/343 |
| 1,744,369 | 1/1930 | Dietz et al. | |
| 2,913,569 | 11/1959 | Edelstein | 240/1.3 |
| 4,052,607 | 10/1977 | Larson | 362/18 |
| 4,200,902 | 4/1980 | Intrator | 362/17 |
| 4,409,646 | 10/1983 | Baliozian | 362/17 X |
| 4,504,888 | 3/1985 | Rosenthal | 362/17 X |
| 4,570,205 | 2/1986 | Shiojiri | 362/18 |

*Primary Examiner*—Stephen F. Husar
*Attorney, Agent, or Firm*—Welsh & Katz, Ltd.

[57] ABSTRACT

An improved banklight system which is uniquely designed to provide lighting effects that have heretofore been unavailable in known and existing banklight devices is disclosed. More particularly, the banklight system embodying the present invention is adapted to easily provide adjacent areas of gradated lighting effects, i.e., provide one area of light that has a generally uniform light projection and light image adjacent a second area of generally uniform light projection and light image, with the second area having a reduced intensity. Further, the system permits the relative size of the two areas to be easily adjusted by a photographer so that the desired effects for a particular photograph can be achieved.

28 Claims, 2 Drawing Sheets

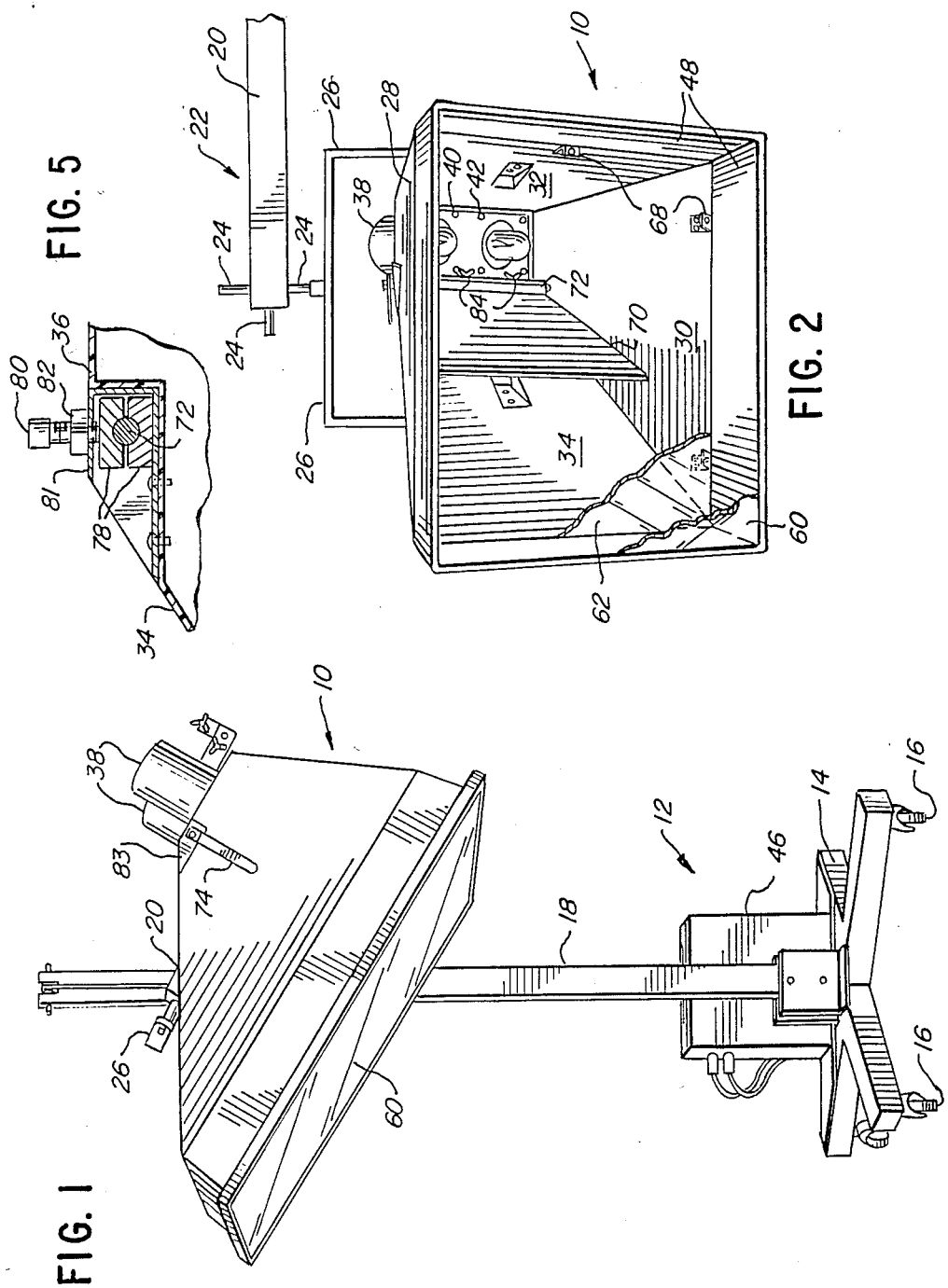

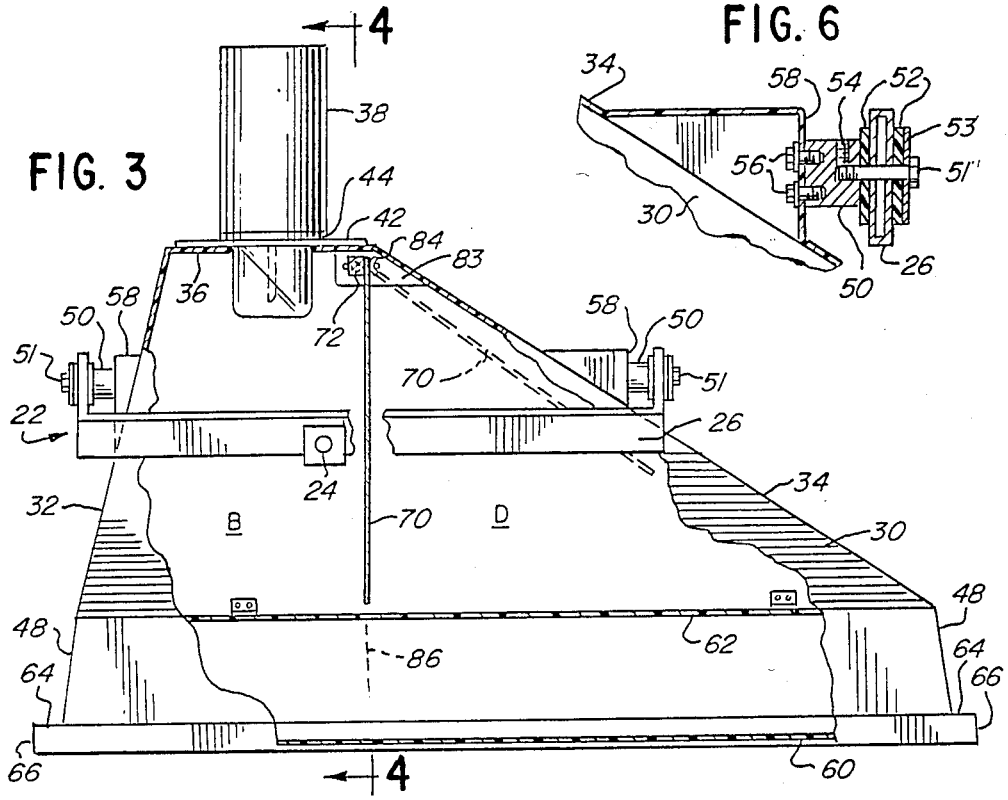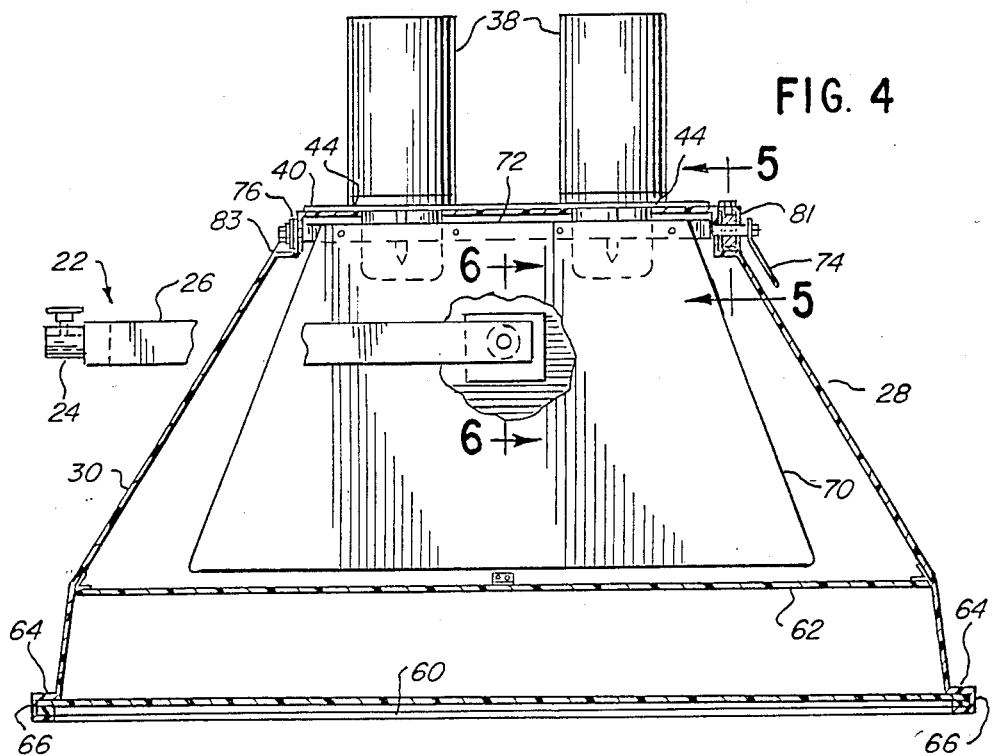

BANKLIGHT SYSTEM FOR PRODUCING VARIABLE GRADATION LIGHTING EFFECTS

The present invention generally relates to banklight systems for use by photographers, and more specifically relates to an improved banklight system that is adapted to provide specific and variable gradation lighting effects.

Professional photographers have used various light modifying devices and techniques for decades to produce "soft light" lighting effects to provide optimum photographs of a variety of subjects, ranging from objects of varied size, shape and color, to people. A significant part of the skill of a good commercial photographer resides in the ability to achieve the optimum lighting effects that the photographer uses with the particular subject being photographed so that a good photograph is obtained. While a skilled commercial photographer may produce outstanding photographs with a maze of makeshift light modifying components, such as reflectors, screens, baffles, flags, umbrellas, and the like, the time required to initially construct the set-up for each unique subject to achieve the desired effects in the resulting photograph may be extensive. Reconstructing the set-up at a later date, even when the photographer knows what it entails, may also be very time consuming. As with almost all professions, a commercial or professional photographer's time is valuable.

Many photographers have used commercially available light modifying devices for some time to achieve "soft light" lighting effects. These devices are commonly referred to as banklights or lightbanks, and are the most commonly used light source for commercial product photography. These commercially available units are generally either rigid in design, being made of plastic, fiberglass, or aluminum formed in a shell shaped configuration, or they are constructed of fabric stretched over aluminum or fiberglass rods. Other photographers prefer to construct their own devices from foamboard, plywood or sheet metal.

These light modifying devices all generally operate in the same basic manner to produce the same basic lighting effects, and generally share common design elements. Generally all of the units act as a large reflector, comprise a box or pyramid shaped enclosure that tapers to a square or rectangular front opening. Most of the units are designed to be used with a variety of "point light sources", usually electronic flash-heads, or high-intensity tungsten or quartz "raw" light sources. Most of the devices have one or more holes centrally located on the back surface of the box. The "point light source" is inserted through the hole or holes so that the light emitted from it will bounce off of the inner walls and will be directed out of the open end of the enclosure. The interior of the box is light reflective, either white or silver, and a panel of translucent light diffusing material is mounted across the front opening of the enclosure opposite the light source. The panel of light diffusion material may comprise a single layer or may be multiple layers of such material spaced apart from one another. These devices produce, with varying degrees of success, a soft and relatively even projection of light.

To appreciate the effectiveness of such a light modifying device, and indeed the present invention, it must be evaluated under two lighting criteria, known to most competent photographers as light projection and light image.

Light projection is a term that refers to the characteristics of the actual light that is emitted from a light source, i.e., the light that falls on the subject. The light projection of a given light source or light modifying device may be evaluated for its evenness, its coverage and its contrast. These characteristics are measured or evaluated at the standard working distance for the type of light being considered. For a lightbank, this is generally at a distance equal to the front diffuser dimension, e.g., at a distance of three feet from the surface of the front diffuser for a device having a three square foot front diffuser.

Light image is a term that refers to characteristics that are less obvious, but its relevance to photography of subjects such as products or other objects, and to the present invention, is extremely important. More specifically, the term light image refers to the actual appearance of the illuminated surface of a given light source. In the case of a banklight, this is the front diffusion panel. The characteristics of the light on this panel are not a significant factor when photographing porous, non-reflecting subjects on porous, nonreflecting backgrounds. However, when either a background or subject are reflective in nature, they will reflect the image of the front diffuser, picking up all the characteristics of the illumination of the diffuser. In effect, this becomes the "signature" or "finger print" of the light source.

If the front diffuser is evenly illuminated, then the resulting highlights will be even. If the front diffuser is unevenly illuminated, then the highlights in the subject or background will be uneven. If the front diffuser is illuminated with a gradated light (from light to dark), then the highlights in the subject or background will be gradated. In the photography of subjects such as products or other objects, this is a point of major concern. Banklights are often used by commercial photographers because they generally produce superior lighting effects on a variety of subjects, such as products constructed of plastic, glass, glazed ceramic or metal, and will take on a specific finish quality when photographed using light sources that have different "light image" qualities.

The foregoing discussion rather comprehensively describes the major considerations that are involved in the use of commercially available and known banklights that have been used in the art. While these known devices provide many desirable attributes, the previously described banklights provide a relatively even light projection and light image. They produce a single value light projection and light image which is just fine for many applications.

However, certain subjects are more desirably photographed with a light source that is modified to produce a "two tone" or "two value" lighting effect, i.e., an area of more intense light adjacent an area of lesser value, with each area having generally uniform light image and light projection within it. Such a two tone lighting effect may be desirably used to produce such obvious benefits and applications as providing a lighting background that is gradated to produce an illusion of depth. It can also greatly increase the definition of shape, particularly for rounded or curved objects, so as to provide illumination over the entire surface of the object, while retaining a three dimensional appearance. It can also effectively illuminate subjects having an inherent contrast range which requires an increased amount of light on one portion of the subject, and a reduced amount on the other.

Accordingly, it is a primary object of the present invention to provide an improved banklight system that produces variably gradated lighting effects that are extremely beneficial in certain photographic applications.

It is another object of the present invention to provide such an improved banklight system which produces variably gradated lighting effects, wherein a two level or two tone effect is provided.

Still another object of the present invention is to provide such a two level effect, whereby an area of higher intensity light is provided adjacent an area of lower intensity light, with the relative areas being adjustable, and each area having a substantially uniform light image and light projection.

Another object of the present invention is to provide such an improved banklight system having the above described attributes which is contained in a single device and is quickly set-up to minimize the time required to achieve a two level lighting effect, and which can also be easily reproduced at a subsequent time, if desired.

Yet another object of the present invention lies in the provision of providing such an improved banklight system which is fabricated from a relatively small number of components, and yet which is capable of producing lighting effects that have not been heretofore achieved by conventional banklight systems.

These and other objects and advantages will become apparent from the ensuing detailed description, while referring to the attached drawings, in which:

FIG. 1 is an elevational perspective view of the banklight system embodying the present invention, shown with a stand for supporting the banklight device in one of any number of orientations;

FIG. 2 is a another elevational perspective view of the banklight system embodying the present invention, and is shown from beneath the system upwardly directed, and having the front diffuser removed to illustrate the interior of the banklight device;

FIG. 3 is a side elevation of the banklight device shown in FIG. 1, shown with portions removed and shown in section to illustrate interior components;

FIG. 4 is a cross section of the banklight device shown in FIG. 1, and is taken generally along the line 4—4 of FIG. 3;

FIG. 5 is a cross section of a portion of the banklight device shown in FIG. 1, and is taken generally along the line 5—5 of FIG. 4; and, FIG. 6 is a cross section of another portion of the banklight device shown in FIG. 1, and is taken generally along the line 6—6 of FIG. 4.

DETAILED DESCRIPTION

Broadly stated, the present invention is directed to an improved banklight system which is uniquely designed to provide lighting effects that have heretofore been unavailable in known and existing banklight devices. More particularly, the banklight system embodying the present invention is adapted to easily provide adjacent areas of gradated lighting effects, i.e., provide one area of light that has a generally uniform light projection and light image adjacent a second area of generally uniform light projection and light image, with the second area having a reduced intensity. Further, the system permits the relative size of the two areas to be easily adjusted by a photographer so that the desired effects for a particular photograph can be achieved.

The production of two tone or two level lighting effects have been done in the past, and even have been accomplished while utilizing commercially available banklights, but have always required additional elements and multiple light sources, all of which require much manipulation and adjustment to achieve the desired results. To emphasize the point, in the past, in order to achieve this effect, it was necessary for the photographer to use a number of photographic lighting and suspension components. With conventional lighting equipment, the photographer would first have to determine the exact position of the light source with respect to the subject being illuminated, i.e., top lighting, side lighting, back lighting or front lighting. The photographer would also have to determine the proper distance for the light source to be from the subject, and the angle of the light. Then the photographer would need to support two diffusion frames—spaced apart and parallel to each other, two light sources—one for providing illumination for each brightness value of the front diffuser, and a series of flags and reflector cards to contain and control the light.

The above described type of lighting set-up was and is tedious and time consuming to construct, and because it is comprised of a number of separate elements, it is impossible to easily move to a different location. Additionally, later reconstruction of the exact set-up is very difficult, and produces inconsistent results when an attempt to match a prior photograph is being attempted.

The present invention removes the tediousness and uncertainty that occurs from the above described steps, because it provides the two tone or two level lighting effect from a single self-contained package that is easily adjusted to obtain the desired lighting effects. Because of this, the conditions or lighting effects can be easily duplicated at a later date, if desired. More specifically, consistent results can be obtained with the present invention, because it can be easily set to produce the same contrast ratios and lighting values in an easily repeatable manner.

Turning now to the drawings, a preferred embodiment of the present invention is shown in FIG. 1, and includes a banklight device, indicated generally at 10, which is supported by a stand, indicated generally at 12, which includes a cross membered base 14 that is moveable around a studio or the like by means of wheels 16. The base 14 is attached to a vertical support column 18 from which an adjustable boom 20 interconnects the banklight device 10 to the column 18 to provide the desired elevation and angular orientation of the device 10 with respect to a subject being photographed. As is best shown in FIGS. 2, 3 and 4, the boom 20 is attached to a clamp mechanism 22 of conventional construction, and which permits the device to be vertically positioned. The boom can be oriented so that the light can be upwardly or horizontally directed, but these orientations are not shown in the drawings. The boom 20 has a number of rods 24 attached at the outer end, any one of which can receive and be attached to a yoke 26 (see FIGS. 2, 3 and 4). The yoke 26 is connected to the banklight device 10 so that it can be pivotally adjusted along an axis perpendicular to the rod 24, as is readily apparent from the drawings. The rod 24 is angularly adjustable and is retained by a set screw or the like that is threaded into an aperture in the boom 20. The rod 24 enables the banklight device to be rotated to orient the device 10 from the position shown in FIG. 1, where the light is downwardly directed, to other positions such as horizontally or upwardly directed which are not shown in the drawings.

The housing is preferably constructed of fiberglass and preferably has an interior surface that is light reflective such as white. It should be understood, however, that the housing may be constructed of other material, such as wood, aluminum, or the like, and may even comprise a collapsible frame construction that has a flexible fabric or the like defining the side and end walls, inasmuch as the function of the walls is to define and confine the light that is transmitted to the front panel of the device, and the material used in the construction of the housing is not the primary consideration.

The banklight device 10 is preferably shaped as shown in the drawings and comprises a housing having side walls 28 and 30, and end walls 32 and 34, and a back or rear wall 36. The back wall 36 is adapted to receive one or more light sources, which in the embodiment illustrated, comprises two light sources 38. The fiberglass housing has an opening that is substantially the size of the back wall 36, with the fiberglass housing having an approximately one inch lip 40 around the opening on which a back plate 42 can be attached by screws or the like. The back plate also has openings in which conventional flash head mounts 44 can be attached, with the flash head mounts being adapted to receive the light sources 38 in a conventional manner so that they can be removed for use in other equipment. In this regard, the light sources 38 can be stroboscopic units, powered by a power supply 46 (see FIG. 1) or a continuous tungsten light source if desired. The particular light source used is not of particular significance to the present invention.

The angles of the side walls 28 and 30, as well as the end wall 32 relative to the plane of the back wall are generally equal, and are within the range of approximately 105 degrees to approximately 130 degrees. However, the angle of the end wall 34 is substantially larger, preferably within the range of approximately 140 degrees to approximately 150 degrees to provide an asymmetric construction that contributes to the desirable two level or two tone lighting effects that have been described.

Each of the walls 28, 30, 32 and 34 have an extension 48 which is of a steeper angle relative to the back wall 36, and is preferably within the range of approximately 95 degrees and 105 degrees. As is best shown in FIGS. 3 and 4, the outer ends of the yoke 26 are attached to the device 10 with a pair of cylindrical blocks 50 (see detail of FIG. 6), each of which has a bolt 51 that passes through an opening in the end of the yoke and is threaded into the cylindrically shaped block 50. A pair of Teflon washers 52 are positioned in contact with the yoke 26 and a metal washer 53 is positioned between the outer Teflon washer 52 and the bolt head. A set screw 54 is adapted to be tightened against the bolt 51 to keep it secure and the block 50 is attached to a housing boss 58 by a pair of bolts 56. The bolt 51 can be tightened to provide the requisite degree of friction so that the device will maintain the orientation in which it is placed by the photographer.

The housing walls 32 and 34 each have an expanded section formed therein which provides the boss 58 that is generally perpendicular to the front of the device and contains openings through which the bolts 56 pass for connecting the mechanisms 50 to the device.

The housing walls define a front opening in which a front diffuser 60 is removably attached. The device also preferably has an internal diffuser 62 that is spaced from the front diffuser 60 and is preferably located at the interface of the section 48 with the side and end walls. The combination of the two diffusers provides a smooth transition of light from one area to another on the surface of the outer diffuser as will be described. The diffusers preferably have an aluminum frame that can be attached to the housing and have a diffusing material extending across the area defined by the frame. The material is preferably a plastic matt velum material of 5 mils thickness, such as that manufactured by the Rosco Company under the name "rolux", but may be a plexiglass material or a white rip stock nylon or may be sailcloth or the like. The material is preferably of a type that will only absorb sufficient light so that approximately ½ f-stop is lost when measured through the material, i.e., from the inside to the outside of the front diffuser 60 when the diffuser is attached to the device.

To retain the front diffuser 60, the extension 48 of the housing has an approximately one inch lip 64 parallel to the plane of the diffuser and has a perpendicular lip 66 sized slightly larger than the outer dimension of the frame. The front diffuser can be fitted into the housing and can be attached to the parallel lip 64 by a number of allen headed screws or the like. The internal diffuser 62 can similarly be attached to the housing by means of similar screws or the like, which are attached to appropriately positioned brackets 68 (see FIG. 2) that are secured to the inside of the housing.

In accordance with an important aspect of the present invention, an internal baffle or flag 70 is provided inside the housing, which is angularly adjustable to vary the light that is transmitted to the diffusers. The baffle 70 is attached to a pivotable member 72 which is secured to the housing and one end of the member 72 has a lever 74 attached to it which pivots with the member 72. The lever 74 performs two functions in that it indicates the angular position of the baffle 70 and also acts as a control lever for a photographer to adjust the position of the baffle. The member 72 is preferably made of aluminum and has a generally square or rectilinear cross section substantially throughout its length and has end portions which are circular to facilitate pivoting movement of the member and the baffle that is attached to one of the sides of the member as shown in FIG. 3. The end of the member 72 opposite the end having the lever attached thereto is preferably journalled in a conventional bearing 76, and the end carrying the lever 74 is pivotable in a bearing construction (see FIG. 5) that comprises two opposed blocks 78 that can be tightened relative to one another by a bolt 80 that is threaded in the top of a box shaped channel 81. A locking nut 82 fits over a threaded insert for holding the bolt 80 in place. The bolt 80 can be suitably adjusted to vary the degree of friction so that the baffle can be easily moved but will retain the position in which it is placed. The housing has a pair of recesses 83 formed in it, which have openings therein, and which define a boss through which the member 72 can pass.

The baffle 70 has a shape that preferably extends between the sides 28 and 30 and yet is pivotable through an extended arc. When the baffle is placed in the position shown in phantom in FIG. 3, the outer edges of the sides are preferably approximately ½ inch from the interior surfaces of the side walls 28 and 30. When the baffle is pivoted to a position generally perpendicular to the front diffuser, as is shown in FIGS. 3 and 4, the gap between the sides of the lower part of the baffle and the side walls necessarily increases because of the angular orientation of the side walls. The bottom of the baffle 70 preferably extends to an elevation to provide a comfortable clearance from the inner diffuser 62, as shown in FIG. 4. The baffle is preferably removably secured to the member 72 by two or more wingnuts 84 or the like to facilitate easy replacement with other baffles having different light modifying characteristics.

During operation, the banklight device 10 of the present invention has demonstrated superior operating characteristics in terms of its ability to easily and repeatedly produce adjustable two tone or two level lighting effects. With the embodiment illustrated in the drawings, the front diffuser 60 is preferably about three feet long and three feet wide, even though the housing is asymmetrical. The baffle 70 can be positioned within the housing to divide the inside into two volumes, which for purposes of discussion, are designated as the bright area B and a dimmer area D. The bright area B is on the side of the baffle having the light source 38 and the dimmer area D is on the side opposite the bright area B. As is apparent from the drawings and the foregoing description, the size of the areas B and D can be changed by changing the position of the baffle 70 to increase the size of area B while decreasing the size of area D, or vise versa. The sizes of the areas B and D result in the varying of the relative sizes of the two tone lighting effects produced on the front diffuser and a transition from one value to the other occurs along a line that generally intersects a downward extension of the plane of the baffle as shown by the dotted line 86 in FIG. 3.

The superior control of the two tone light effects can be demonstrated by empirical data, which is most conveniently and accurately stated in terms of f-stop variation over a distance and at different distances from the front diffuser. This type of measurement is independent of the strength and type of light source, since a decrease of 1 f-stop means that ½ of the light is produced at the light measuring device, a decrease of 2 f-stops means ¼ of the light is produced at the light measuring device, and so on, as knowledgeable photographers appreciate and understand.

The asymmetrical shape of the housing, with the light source located near the end of the housing as shown in the illustrated embodiment produced a gradation of light along the length of the front diffuser of approximately 1.5 f-stops, i.e., from the end 32 to the end 34, when measured at the surface of the front diffuser and with the baffle moved out of the way as shown in phantom in FIG. 3. The gradation of this configuration, when measured at the working distance of three feet from the surface of the front diffuser (the light projection) was approximately 0.3 f-stops from end to end. The variation of the measured light in the opposite direction, i.e., from side 28 to side 30, was essentially constant as would be expected.

In contrast to the above described configuraion, a conventional symmetrical banklight having no internal baffle and having a centrally located light source produced a 0.5 f-stop variation from the center to each end measured at the front diffuser, and an approximately 0.2 f-stop variation from the center to the ends at the three foot working distance.

In another configuration where a baffle having both surfaces white was placed in a position generally perpendicular to the front baffle as shown in FIG. 3, a gradation of light was produced whereby the measured light at the surface of the front diffuser in the B area was approximately 3 f-stops dimmer than that measured in the D area (the light image). The gradation of this configuration, when measured at the working distance of three feet from the surface of the front diffuser (the light projection) was approximately 0.5 f-stops from the area B to the area D. Stated in other words, the contrast ratio of the two areas B and D was approximately 3 f-stops at the surface and 0.5 f-stops at the working distance of three feet.

In yet another configuration where a baffle having a white surface on the bright side B and a light absorbing color or black surface on the dimmer side D was placed in a position generally perpendicular to the front baffle as shown in FIG. 3, a gradation of light was produced whereby the measured light at the surface of the front diffuser in the B area was approximately 3.8 f-stops dimmer than that measured in the D area (the light image). The gradation of this configuration, when measured at the working distance of three feet from the surface of the front diffuser (the light projection) was approximately 0.7 f-stops from the area B to the area D. Stated in other words, the contrast ratio of the two areas B and D was approximately 3.8 f-stops at the surface and 0.7 f-stops at the working distance of three feet.

In still another configuration, a baffle having a white surface on both the bright side B and the dimmer side D, but which has approximately ½ inch holes cut or formed in a baffle to provide approximately 50% of the surface of the baffle occupied by open spaces (or otherwise light transparent areas) was placed in a position generally perpendicular to the front baffle as shown in FIG. 3, a gradation of light was produced whereby the measured light at the surface of the front diffuser in the B area was approximately 2.3 f-stops dimmer than that measured in the D area (the light image). The gradation of this configuration, when measured at the working distance of three feet from the surface of the front diffuser (the light projection) is approximately 0.4 f-stops from the area B to the area D. Stated in other words, the contrast ratio of the two areas B and D was approximately 2.3 f-stops at the surface and 0.4 f-stops at the working distance of three feet.

The above configurations produced significant and repeatable results that provide excellent control to a photographer, and which can be capsulized in the following table. The term "without baffle" means that the baffle is moved out of position to interfere with the light source, the term "W" means white and the term "B" means black or light absorbing.

TABLE

| Contrast Ratio In F-Stops) | Without Baffle | With Holed Baffle (W/W) | With Solid Baffle (W/W) | With Solid Baffle (B/W) |
|---|---|---|---|---|
| light projection (measured at 3 ft) | 0.3 | 0.4 | 0.5 | 0.7 |
| light image (measured at diffuser surface) | 1.5 | 2.3 | 3.0 | 3.8 |

From the foregoing, it should be appreciated that a significantly improved banklight system has been shown and described which offers many desirable attributes and benefits to a photographer. The system readily permits lighting effects to be achieved which were only previously attainable using a variety and large number of elements. Because the lighting effects can be achieved with a single device, it is easily possible to accurately reproduce the conditions that were used in a prior setup, and do so in a short period of time.

Although various embodiments of the invention have been shown and described in full herein, there is no intention to limit the invention to the details of such embodiments. On the contrary, it is the intention that the invention cover all of the various modifications, alternatives, substitutions and equivalents that may fall within the spirit and scope of the invention as set forth in the appended claims.

Various features of the invention are set forth below.

What is claimed is:

1. A banklight system for use in illuminating a subject to be photographed whereby the light image and light projection of a predetermined area exposed to the illumination can be varied, said system being adapted for use with an illuminating means that can be mounted thereto, comprising:
   a housing having a rear wall, opposite side walls, opposite end walls, and a generally flat diffuser means located at the front portion of the housing, said housing having at least one aperture for receiving an illuminating means for illuminating the interior of said housing, said housing being adapted so that light emitted by said illuminating means is transmitted through said diffuser means;
   a baffle means located within said housing between said diffuser means and said rear wall, said baffle means being adjustably positioned within said housing to define a first area of said diffuser means and a second area of said diffuser means to adjust the light image and light projection properties of the light emitted therethrough, the relative sizes of the first and second areas varying in response to adjustment of the position of said baffle means; and means for adjusting the position of said baffle means.

2. A system as defined in claim 1 wherein said housing further comprises a generally flat rear wall, said rear wall having said aperture for receiving a backplate adapted to engage a light source, said housing having four generally flat side walls arranged with respect to one another to define a generally truncated pyramidal shape.

3. A system as defined in claim 2 wherein said truncated pyramidal shape is asymmetrical.

4. A system as defined in claim 3 wherein said asymmetrical pyramidal shape has two opposed side walls that are symmetrical and the remaining two end walls are asymmetrical.

5. A system as defined in claim 4 wherein said side walls are angled at a first predetermined angle within the range of approximately 110 degrees and 130 degrees from the interior of said housing relative to the plane of said rear wall, one end wall being at a second predetermined angle within the range of approximately 100 degrees and 110 degrees, and said other end wall is angled at a third predetermined angle within the range of approximately 140 degrees and 155 degrees.

6. A system as defined in claim 1 wherein said diffuser means comprises at least one generally flat layer of diffusing material that is capable of transmitting light therethrough.

7. A system as defined in claim 6 wherein said diffusing material comprises material that absorbs light so that the measured light through the material is approximately 0.5 f-stops.

8. A system as defined in claim 6 wherein said diffuser means comprises a pair of generally flat layers of diffuser means material spaced apart from one another by a predetermined distance.

9. A system as defined in claim 8 wherein said predetermined distance comprises approximately 5 inches.

10. A system as defined in claim 7 wherein said diffusing material comprises a thin layer of plastic matt velum having a thickness of approximately 5 mils.

11. A system as defined in claim 7 wherein said diffusing material comprises a layer of cloth.

12. A system as defined in claim 1 wherein the illuminating means comprises at least one point light source.

13. A system as defined in claim 12 wherein the point light source comprises a stroboscopic light producing means.

14. A system as defined in claim 12 wherein the point light source comprises a continuous tungsten light source.

15. A system as defined in claim 1 wherein said housing has interior surfaces on said rear wall, end walls and side walls that are light colored so as to provide a high degree of reflectivity.

16. A system as defined in claim 1 wherein said baffle means is generally flat shaped and has a cross section that extends generally from said rear wall to said diffuser means, and the sides of said baffle means terminate a predetermined distance from opposite sidewalls of said side walls, when said baffle means is positioned adjacent said other end wall.

17. A system as defined in claim 16 wherein said baffle means is of a light color to provide a relatively high reflectivity.

18. A system as defined in claim 16 wherein said baffle means has a light colored surface on the side exposed to said light source and a dark light absorbing surface on the opposite side thereof.

19. A system as defined in claim 17 wherein said baffle means has a plurality of light transparent areas occupying approximately 50% of said baffle means.

20. A system as defined in claim 19 wherein said light transparent areas comprise openings in said baffle means.

21. A system as defined in claim 1 further including adjustable mounting means for adjustably positioning said housing relative to a subject to be photographed.

22. A system for illuminating a predetermined area for photographing a subject within the area, whereby the system provides a graduated light projection, the first portion of said area having a light image of a first magnitude and a second portion of said area having a light image of a second magnitude, said system comprising:
   a housing having a rear wall, opposed side walls, opposed end walls and a diffuser means including at least one, generally flat layer located near the front of the housing, said rear wall having an aperture through which an illuminating means can be passed to illuminate the interior of said housing, and to transmit light through said diffuser means;
   an illuminating means mounted to said housing for illuminating the interior of said housing through said aperture;
   a baffle means located between said diffuser means and said rear wall, said baffle means being adjustable within said housing to define a first portion and a second portion, said first and second portions being in communication with said diffuser means regardless of the position of said baffle means, the relative size of the first and second portions varying in response to adjustment of the position of said baffle means; and means located exteriorly of the housing and connected to said baffle means, for adjusting the position of said baffle means.

23. A banklight enclosure apparatus adapted to be used in combination with a light source for illuminating a subject, whereby the light image and light projection of a predetermined area exposed to the illumination produced by said illumination means can be controlled and can be varied, said apparatus comprising:

a housing having a rear wall, opposed side walls, opposed end walls and a generally flat diffuser means located near the front of the housing, said rear wall having an aperture through which an illuminating means can be passed to illuminate the interior of said housing;

a baffle means located between said diffuser means and said rear wall, said baffle means being pivotally adjustable within said housing to define a first area directly exposed to said light source and a second area indirectly exposed to said light source, the relative sizes of the first and second areas varying as the angular position of said baffle means relative to said rear wall is adjusted; and control means located exteriorly of the housing and connected to said baffle means, for adjusting the position of said baffle means and for indicating the angular position of said baffle means.

24. A system as defined in claim 23 wherein said control means is a lever connected to said baffle means and positioned exteriorly of said housing so that the angular orientation of said lever in relation to said rear wall corresponds to and provides an indicator of the angular orientation of said baffle means in relation to said rear wall.

25. Apparatus for use with a photographic light source for illuminating a subject to be photographed, wherein a two value illumination of the subject can be achieved, whereby the light image and light projection of one area is different from the light image and light projection of another area, the contrast ratio of the light image and light projection of the two areas being controlled and the relative sizes of the areas being adjustable, said apparatus comprising:

a housing having a back wall, opposed side walls, opposed end walls and a generally flat diffuser means located near the front of the housing, said back wall having an aperture through which the light source can be passed to illuminate the interior of said housing, the housing being asymmetrical in that one of said end walls is of substantially greater angle relative to the plane of said back wall as measured from the interior of the housing, the light source being located adjacent the back wall and the other of said end walls;

at least one baffle means located in said housing and adapted to be positioned to block the light produced by said light source and produce first and second areas of said diffuser means that have a contrast ratio of light image and light projection values, the relative sizes of said first and second areas being variable as a function of the position of said baffle means.

26. An apparatus as defined in claim 25 wherein the light image and light projection values within each of the first and second areas is substantially constant.

27. An apparatus as defined in claim 25 wherein said baffle means is pivotally attached to said housing and includes a lever operably attached thereto which functions to adjust the angular orientation of said baffle means within said housing and to provide an indicator of the angular position of said baffle means.

28. A banklight system for use in illuminating a subject to be photographed whereby the values of both the light image and light projection of a predetermined area exposed to the illumination can be independently varied, said system being adapted for use with an illuminating means that can be mounted thereto, comprising:

a housing having a rear wall, opposite side walls, opposite end walls, and a generally flat diffuser means located at the front portion of the housing, said housing having at least one aperture for receiving an illuminating means for illuminating the interior of said housing;

at least one baffle means adapted to be removably mounted within said housing between said diffuser means and said rear wall, said at least one baffle means being adjustably positioned within said housing to define a first area of said diffuser means and a second area of said diffuser means, the relative sizes of the first and second areas varying in response to adjustment of the position of said baffle means;

each of said baffle means having a different set of light absorbing characteristics on opposite sides thereof so as to transmit a different amount of light from said illuminating means to said second area than is transmitted to said first area; thereby providing varying values of light image; and means for adjusting the position of said baffle means to adjust the relative sizes of said first and second areas, thereby providing a graduated light projection.

* * * * *